United States Patent [19]
Watanabe et al.

[11] Patent Number: 5,229,216
[45] Date of Patent: Jul. 20, 1993

[54] VIBRATION-DAMPING SHEET

[75] Inventors: Yoshiaki Watanabe, Chiryu; Hideo Suganuma, Toyoda; Masataka Terashima, Nagoya, all of Japan

[73] Assignee: Nihon Tokushu Toryo Co., Ltd., Tokyo, Japan

[21] Appl. No.: 784,602

[22] Filed: Oct. 24, 1991

Related U.S. Application Data

[63] Continuation of Ser. No. 467,950, Jan. 22, 1990, abandoned.

[30] Foreign Application Priority Data

Jan. 23, 1989 [JP] Japan ..................... 1-11985

[51] Int. Cl.$^5$ .............................. B32B 11/02
[52] U.S. Cl. .................. 428/489; 106/281.1; 106/284.03; 106/284.04; 524/425; 428/323; 428/330
[58] Field of Search ............. 428/323, 325, 327, 330, 428/331, 489; 106/276, 281.1, 284.03, 284.04; 524/81, 425, 493, 494, 495; 252/183.16

[56] References Cited

U.S. PATENT DOCUMENTS

| | | | |
|---|---|---|---|
| 2,999,762 | 9/1961 | Verdier | 106/284.04 |
| 3,617,377 | 11/1971 | Isshiki et al. | 428/372 X |
| 4,157,997 | 6/1979 | DeMejo et al. | 524/425 |
| 4,287,263 | 9/1981 | Woodring et al. | 428/489 |
| 4,412,864 | 11/1983 | Kurashige et al. | 106/235 |
| 4,711,672 | 12/1987 | Gorter et al. | 106/284.04 |
| 4,861,804 | 8/1989 | Nakanishi | 521/54 |
| 4,895,754 | 1/1990 | Graham et al. | 428/289 |

FOREIGN PATENT DOCUMENTS 52-39723 3/1977 Japan.
61-51019 3/1986 Japan.
62-27455 2/1987 Japan.

*Primary Examiner*—George F. Lesmes
*Assistant Examiner*—Christopher Brown
*Attorney, Agent, or Firm*—Flynn, Thiel, Boutell & Tanis

[57] ABSTRACT

This invention is a light weight vibration-damping sheet comprising an asphalt binder component, a hollow filler component and a surface treated calcium carbonate treated with a higher fatty acid or its salt, such as aluminum stearate, which acts as a hollow filler dispersion agent. As the hollow filler is dispersed uniformly in the asphalt, the sheet forming workability of the composition is greatly improved.

16 Claims, No Drawings

VIBRATION-DAMPING SHEET

This application is a continuation of U.S. Ser. No. 07/467,950, filed Jan. 22, 1990, now abandoned.

BACKGROUND OF THE INVENTION

1. Field of the Invention

The invention relates to an improved light weight vibration-damping sheet which mainly comprises an asphalt component and a hollow filler component and is manufactured by melting asphalt, mixing hollow fillers therewith and rolling the mixture into a form of sheet.

2. Prior Art

It is well known to employ a vibration-damping sheet in vehicles, particularly in automobiles, in order to reduce vibration caused by an engine. Usually, the sheets are firmly fixed by fusion or placed on the steel panel of the car floor, of the door, or of the trunk.

The applicants have already disclosed a heat fusible light weight vibration-damping sheet composition, which mainly comprises an asphalt component and a hollow silicate filler component in order to reduce the weight of said composition, in the specification of Japanese laid open 77-39723 Kokai 52-39723). In this prior art light weight vibration-damping sheet composition, the objective of the weight reduction is accomplished by the use of a hollow silicate filler whereas the workability of said composition into a sheet form is not satisfactory.

In general, for the purpose of reducing the weight of the automobile, a thinner vibration-damping sheet is often applied to the automobile but, on the other hand, the vibration-damping effect of the thinner sheet decreases and the level of the vibration is not tolerable to the drivers or the passengers.

By use of the above mentioned light weight vibration-damping sheet composition having a hollow filler component, weight reduction purpose is achieved but the sheet forming workability of said composition is not sufficient because it is difficult to disperse hollow silicate filler uniformly in asphalt.

The objective of this invention is to solve the above mentioned problem, that is, to disperse hollow silicate filler uniformly in asphalt.

BRIEF DESCRIPTION OF THE INVENTION

The inventors of this invention reached their objectives as a result of an intensive research.

The vibration-damping effect of this invention is equal or superior to that of the prior art, while on the other hand, the weight of the vibration-damping sheet according to this invention is lighter than conventional ones and its sheet forming workability is considerably improved by adding surface treated calcium carbonate into the composition.

The vibration-damping sheet of this invention comprises a binder, mainly consisting of asphalt, a hollow filler and surface treated calcium carbonate in order to disperse the hollow filler uniformly in the binder.

DETAILED DESCRIPTION OF THE INVENTION

The composition of the fusible vibration-damping sheet of this invention comprises at least one binder component, a hollow filler and a surface treated calcium carbonate as a filler component.

Preferred examples of the binder component include well known material such as straight asphalt, blown asphalt, and modified asphalt with rubber (rubberized asphalt).

The binder component described above may be used either solely or in combination. Petroleum resins are also used as a binder component if desired.

Preferred examples of the hollow filler include, glass balloon, silas balloon (trade name of baked volcanic ash) and carbon balloon as inorganic hollow fillers organic balloon of copolymers of methyl acrylate, ethyl acrylate, methyl methacrylate, acrylo nitrile, and copolymers of vinyl acetate, vinyl chloride, and styrene copolymerized with acrylic acid resin.

Since the follow fillers are mixed with the binder component and pressed while the mixture is formed into a sheet, these hollow fillers should have a compression strength of 35~1100 $kg/cm^2$, preferably 135~950 $kg/cm^2$, and a heat resistance of more than 150° C.

The amount of hollow filler is preferably from 3 to 50% by weight based on the total weight of the composition. A content of less than 3% by weight will cause no weight reduction effect, whereas a content of more than 50% by weight will cause poor sheet forming workability.

The nature of the hollow filler is not critical and any kind of hollow filler material in the art may be used.

It is essential to use surface treated calcium carbonate to disperse the hollow fillers uniformly into the binder. The surface-treated calcium carbonate is manufactured by treating calcium carbonate with a higher fatty acid, or a mixture of a fatty acid and its salt, is an amount of more than 30% by weight, and having a carbon number of more than 18, such as stearic acid, palmitic acid and oleic acid. A preferable ratio of the hollow filler to the calcium carbonate, while treating, is from 20/80 to 80/20, more preferably 50/50.

Other examples of the filler component are talc, clay and barium sulfate which are powdery inorganic fillers, mica, which is a flaky inorganic filler, and crushed used paper, unwoven fibers, glass wool, or rock wool, which are inorganic or organic fibrous fillers.

Additives such as calcium oxide are added to the composition if desired.

When the composition of the invention is formed into a vibration-damping sheet, it may contain one or more conventional additives in the field such as a plasticizer, stabilizer, flame retardant, foaming aid, vulcanizer, or the like.

The surface treated calcium carbonate acts as an agent for dispersing the hollow filler into the binder so that the hollow filler is uniformly dispersed into the binder of the vibration-damping sheet composition.

Consequently, the sheet forming workability of the composition is greatly improved and a light weight vibration-damping sheet is provided.

The invention will be explained in more detail by the following examples, which by no means limit the scope of this invention, in which parts and percentages are all by weight.

The specific materials used in the following examples and comparative examples are as follows:

| Trade name | Manufacturer |
| --- | --- |
| Calcium carbonate | |
| Calseeds PL | manufactured by Konoshima Chemical. |
| Calseeds P | manufactured by Konoshima Chemical. |

-continued

| Trade name | Manufacturer |
|---|---|
| Calseeds | manufactured by Konoshima Chemical. |
| Hakuenka CCR | manufactured by Shiraishi Calcium. |
| Hakuenka CC | manufactured by Shiraishi Calcium. |
| Hakuenka DD | manufactured by Shiraishi Calcium. |
| Hakuenka U | manufactured by Shiraishi Calcium. |
| Homocal D | manufactured by Shiraishi Calcium. |
| GELTON 50 | manufactured by Shiraishi Calcium. |
| MC-SII | manufactured by Maruo Calcium. |
| MC-T | manufactured by Maruo Calcium. |
| MC-K | manufactured by Maruo Calcium. |
| Hollow Filler | |
| Glass baloon | |
| B38/4000 | manufactured by Sumitomo 3M |
| B28/750 | manufactured by Sumitomo 3M |
| B23/500 | manufactured by Sumitomo 3M |
| Q-CEL 300 | manufactured by Asahi Glass |
| Q-CEL 600 | manufactured by Asahi Glass |
| IG-101 | manufactured by Nippon Silica Industrial |
| IG-25 | manufactured by Nippon Silica Industrial |
| Baked volcanic ash | |
| Sankilite Y04 | Sanki Engineering |
| Sankilite Y02 | Sanki Engineering |
| Organic Hollow Filler | |
| Plastic filler | |
| F-80ED | manufactured by Matsumotoyushi Seiyaku |
| Expancel DE | manufactured by Nippon Fillite |

EXAMPLE 1

A mixture of 51 parts of modified straight/blown rubberized asphalt, as a binder component, 15 parts of glass balloon as a hollow filler component, 15 parts of surface treated calcium carbonate (Calseeds PL; manufactured by Konoshima Chemical), treated with aluminium stearate, 15 parts of mica, 3 parts of organic fiber, and 1 part of calcium oxide were blended in a vacuum kneader and rolled into a sheet by a calender roll.

EXAMPLE 2

A mixture of 51 parts of modified straight/blown asphalt, as a binder component, 18 parts of silas balloon, as a hollow filler component, 12 parts of surface treated calcium carbonate (Hakuenka CCR; manufactured by Shiraishi Calcium), treated with aluminium stearate, 15 parts of mica, 3 parts of organic fiber, and 1 part of calcium oxide were blended in a vacuum kneader and rolled into a sheet by a calender roll.

EXAMPLE 3

A mixture of 51 parts of modified straight/blown rubberized asphalt, as a binder component, 10 parts of an acrylic series vinyl chloride copolymer micro balloon, as a hollow filler component, 20 parts of surface treated calcium carbonate (Calseeds PL; manufactured by Konoshima Chemical), treated with aluminium stearate, 15 parts of mica, 3 parts of organic fiber, and 1 part of calcium oxide were blended in a vacuum kneader and rolled into a sheet by a calender roll.

COMPARATIVE EXAMPLE 1

A mixture of 45 parts of modified straight/blown rubberized asphalt, as a binder component, 46 parts of surface untreated calcium carbonate, 5 parts of mica, 3 parts of organic fiber, and 1 part of calcium oxide were blended in a vacuum kneader and rolled into a sheet by a calender roll.

COMPARATIVE EXAMPLE 2

A mixture of 51 parts of modified straight/blown rubberized asphalt, as a binder component, 15 parts of glass balloon, as a hollow filler component, 15 parts of surface untreated calcium carbonate, 15 parts of mica, 3 parts of organic fiber, and 1 part of calcium oxide were blended in a vacuum kneader and rolled into a sheet by a calender roll.

COMPARATIVE EXAMPLE 3

A mixture of 45 parts of modified straight/blown rubberized asphalt, as a binder component, 46 parts of surface treated calcium carbonate (Calseeds PL; manufactured by Konoshima Chemical), 5 parts mica, 3 parts or organic fiber, and 1 part of calcium oxide were blended in a vacuum kneader and rolled into a sheet by a calender roll.

TEST METHOD

In order to determine the degree of improvement of the invention, the following tests were conducted.

a. To evaluate the sheet forming workability of the composition, the hollow filler dispersion in the binder is observed with the eye.

b. The specific gravity of the composition was measured.

c. The mechanical loss factor value $\eta$ was measured according to the resonance method (described in the Handbook of Counter Measure Against Noise, edited by the Japanese Acoustic Material Association, page 438) at temperatures 20° C., 40° C., 60° C. respectively. It is believed that the vibration-damping effect is proportional to the mechanical loss factor value $\eta$ and if the loss factor $\eta$ is greater than 0.04, the vibration-damping effect is considered to be sufficient. The results of the tests are shown in the following Table 1.

As indicated in the table, the light weight vibration-damping sheet according to this invention has an equal vibration-damping effect to that of the prior art vibration-damping sheets in terms of the loss factor and the sheet forming workability of the composition according to this invention is satisfactory. Further, the specific gravity of the composition is low, that is, the composition is light weight and the weight reduction of the vibration-damping sheet is achieved.

TABLE 1

| | | | Examples | | | Comparative Examples | | |
|---|---|---|---|---|---|---|---|---|
| | | | 1 | 2 | 3 | 1 | 2 | 3 |
| Specific gravity | | | 0.94 | 0.97 | 0.95 | 1.50 | 0.96 | 1.52 |
| Loss factor ($\eta$) | thickness | temperature | | | | | | |
| | 1.7 mm | 20° C. | 0.120 | 0.115 | 0.117 | 0.115 | 0.115 | 0.115 |
| | | 40° C. | 0.078 | 0.070 | 0.074 | 0.050 | 0.060 | 0.050 |
| | | 60° C. | 0.034 | 0.030 | 0.032 | 0.030 | 0.030 | 0.030 |
| | 2.6 mm | 20° C. | 0.175 | 0.170 | 0.175 | 0.170 | 0.170 | 0.170 |
| | | 40° C. | 0.145 | 0.140 | 0.140 | 0.120 | 0.125 | 0.120 |
| | | 60° C. | 0.055 | 0.050 | 0.050 | 0.050 | 0.050 | 0.050 |
| Sheet forming workability | | | good | good | good | good | bad | good |

What is claimed is:

1. A vibration-damping sheet comprising a binder selected from the group consisting of straight asphalt, blown asphalt, rubber-modified asphalt and mixtures thereof, a filler comprising a hollow filler having a compression strength of 35–1100 kg/cm$^2$ and a heat resistance of more than 150° C., and calcium carbonate surface-treated with an agent selected from the group consisting of a fatty acid having a carbon number greater than 18, a salt of said fatty acid and mixtures thereof.

2. A vibration-damping sheet according to claim 1 wherein the calcium carbonate is treated with aluminium stearate.

3. A vibration-damping sheet according to claim 1 wherein a ratio of the hollow filler and the treated calcium carbonate is from 20/80 to 80 to 20 by weight.

4. A vibration-damping sheet according to claim 1 wherein a ratio of the hollow filler and the treated calcium carbonate is 50/50.

5. A vibration-damping sheet according to claim 1 wherein said binder is straight asphalt.

6. A vibration-damping sheet according to claim 1 wherein said binder is blown asphalt.

7. A vibration-damping sheet according to claim 1 wherein the calcium carbonate is treated with a fatty acid selected from the group consisting of stearic acid, palmitic acid, oleic acid, or a salt thereof.

8. A vibration-damping sheet according to claim 1 wherein said binder is a mixture of straight asphalt, blown asphalt and rubber-modified asphalt.

9. A vibration-damping sheet comprising a binder consisting of a mixture of straight asphalt, blown asphalt and rubber-modified asphalt, a filler comprising a hollow filler having a compression strength of 35–1100 kg/cm$^2$ and a heat resistance of more than 150° C., and calcium stearate surface-treated with aluminium stearate.

10. A vibration-damping sheet comprising a binder selected from the group consisting of straight asphalt, blown asphalt and mixtures thereof, a filler comprising a hollow filler having a compression strength of 35–1100 kg/cm$^2$ and a heat resistance of more than 150° C., and calcium carbonate surface-treated with an agent selected form the group consisting of a fatty acid having a carbon number greater than 18, a salt of said fatty acid mixtures thereof, the weight ratio of hollow filler to calcium carbonate being from 20/80 to 80/20.

11. A vibration-damping sheet according to claim 10, wherein said fatty acid is selected from the group consisting of stearic acid, palmitic acid and oleic acid.

12. A vibration-damping sheet according to claim 10, wherein said calcium carbonate is surface-treated with aluminium stearate.

13. A vibration-damping sheet according to claim 10, wherein said binder is straight asphalt.

14. A vibration-damping sheet according to claim 10, wherein said binder is blow asphalt.

15. A vibration-damping sheet according to claim 10, wherein said binder is a mixture of straight asphalt and blown asphalt.

16. A vibration-damping sheet comprising a rubber-modified asphalt binder, a filler comprising a hollow filler having a compression strength of 35–1100 kg/cm$^2$ and a heat resistance of more than 150° C., and calcium carbonate surface-treated with an agent selected from the group consisting of a fatty acid having a carbon number greater than 18, a salt of said fatty acid and mixtures thereof.

* * * * *

UNITED STATES PATENT AND TRADEMARK OFFICE
CERTIFICATE OF CORRECTION

PATENT NO. : 5 229 216
DATED : July 20, 1993
INVENTOR(S) : Yoshiaki Watanabe et al It is certified that error appears in the above-identified patent and that said Letters Patent is hereby corrected as shown below:

Column 6, line 4; change "form" to ---from---.
        line 5; after "acid" insert ---and---.

Signed and Sealed this

Twenty-ninth Day of March, 1994

Attest:

BRUCE LEHMAN

Attesting Officer     Commissioner of Patents and Trademarks